United States Patent
Moon

(10) Patent No.: US 7,444,067 B2
(45) Date of Patent: *Oct. 28, 2008

(54) APPARATUS AND METHOD FOR RECORDING/REPRODUCING MOVING PICTURE AND RECORDING MEDIUM

(75) Inventor: Seong-jin Moon, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 843 days.

This patent is subject to a terminal disclaimer.

(21) Appl. No.: 10/855,352

(22) Filed: May 28, 2004

(65) Prior Publication Data

US 2004/0218892 A1    Nov. 4, 2004

Related U.S. Application Data

(60) Continuation of application No. 09/598,700, filed on Jun. 21, 2000, now Pat. No. 6,775,465, which is a division of application No. 09/507,749, filed on Feb. 22, 2000, now Pat. No. 6,640,046.

(30) Foreign Application Priority Data

Sep. 3, 1999  (KR) ................... 99-37307

(51) Int. Cl.
*H04N 5/91* (2006.01)

(52) U.S. Cl. ............... 386/96; 386/95; 386/125

(58) Field of Classification Search ............. 386/39, 386/45, 95–107, 109, 111, 112, 125, 126

See application file for complete search history.

(56) References Cited

U.S. PATENT DOCUMENTS 5,909,252 A * 6/1999 Ueda et al. ............ 386/111

(Continued)

FOREIGN PATENT DOCUMENTS

EP    0924704 A    6/1999

(Continued)

OTHER PUBLICATIONS

U.S. Appl. No. 09/598,701, filed Jun. 21, 2000, Seong-jin Moon, Samsung Electronics Co., Ltd.

(Continued)

*Primary Examiner*—Robert Chevalier
*Assistant Examiner*—Christopher Onuaku
(74) *Attorney, Agent, or Firm*—Stein, McEwen & Bui, LLP

(57) ABSTRACT

A recording medium includes moving picture data having first audio or first audio and second audio, and basic unit information having first state information on the first audio and second state information on the second audio. The first state information represents an original audio state in which the first audio is original audio, or a secondary audio state in which the first audio is secondary audio recorded over part or all of the original audio. The second state information represents a state in which the second audio is original audio, a state in which the second audio is secondary audio recorded over part or all of the original audio, a state in which the second audio is dummy audio which is exactly the same as the first audio, or a state in which the second audio is secondary audio recorded over part or all of the dummy audio.

8 Claims, 8 Drawing Sheets

U.S. PATENT DOCUMENTS

| | | |
|---|---|---|
| 5,991,394 A | 11/1999 | Dezonno et al. |
| 6,393,206 B1 | 5/2002 | Yagi et al. |
| 6,453,120 B1 * | 9/2002 | Takahashi et al. ........... 386/109 |
| 6,564,006 B1 * | 5/2003 | Mori et al. .................... 386/95 |
| 6,567,607 B2 * | 5/2003 | Ando et al. ................... 386/95 |

FOREIGN PATENT DOCUMENTS

| | | |
|---|---|---|
| EP | 0924704 A2 | 6/1999 |
| EP | 1030307 A1 | 8/2000 |
| JP | 09-259574 | 10/1997 |
| JP | 11-144378 | 5/1999 |
| JP | 2001-043617 | 2/2000 |
| JP | 2000-173183 | 6/2000 |
| JP | 2000-195231 | 7/2000 |
| JP | 2000-306327 | 11/2000 |

OTHER PUBLICATIONS

Continuation of U.S. Appl. No. 09/598,701, filed May 28, 2004, Seong-jin Moon, Samsung Electronics Co., Ltd.

Office Action issued in Korean Patent Application No. 1999-37307 on Mar. 2, 2006.

U.S. Appl. No. 11/290,599, filed Dec. 1, 2005, Seong-jin Moon, Samsung Electronics Co., Ltd.

* cited by examiner

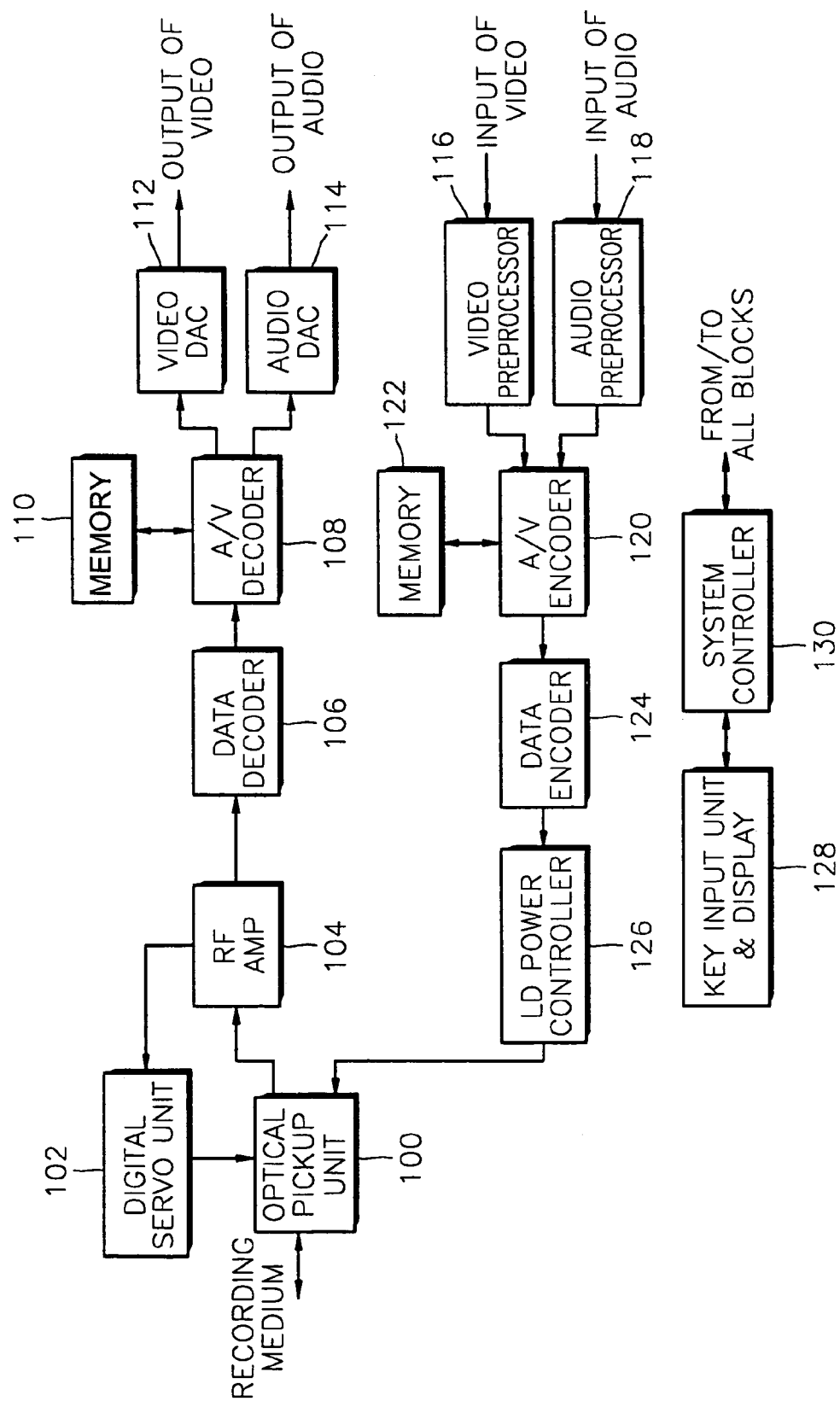

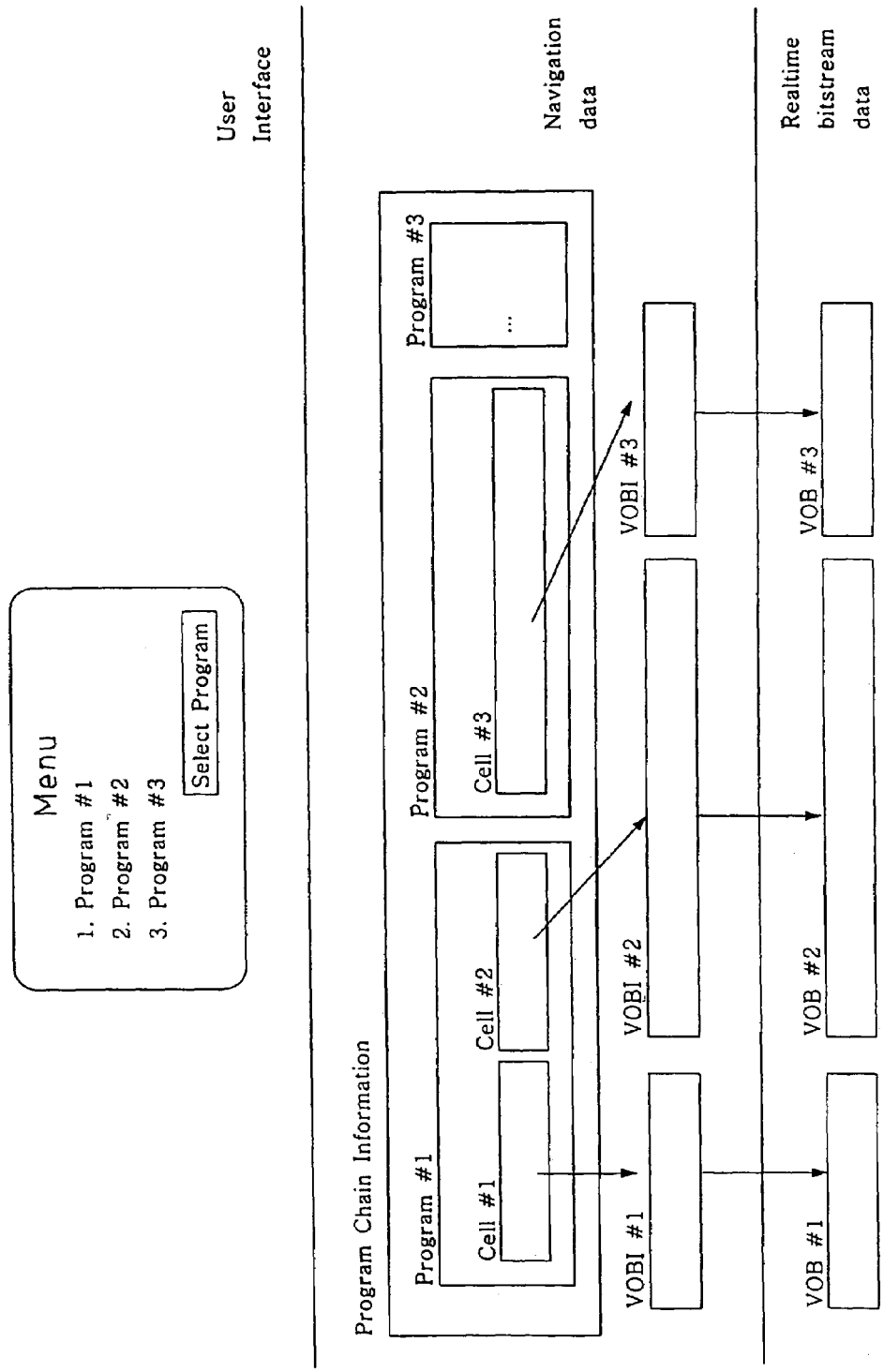

FIG. 4C

| Pack Header | Packet Header | sub_stream_id | Audio Frame Information | Audio data Information | Audio data (Linear PCM) |
|---|---|---|---|---|---| stream_id : 1011 1101b
sub_stream_id : 1010 0000b(Audio 1) or 1010 0001b(Audio 2)

FIG. 4D

| Pack Header | Packet Header | sub_stream_id | Audio Frame Information | Audio data (AC3) |
|---|---|---|---|---| stream_id : 1011 1101b
sub_stream_id : 1000 0000b(Audio 1) or 1000 0001b(Audio 2)

FIG. 5

Video Object Information (VOBI)

| b7 | b6 | b5 | b4 | b3 | b2 | b1 | b0 |
|----|----|----|----|----|----|----|----|
| ... | A0_STATUS | | A1_STATUS | | ... | ... | ... |
| ... | | | | | | | |
| ... | | | | | | | |

FIG. 6A

| Audio a1 | Audio a2 | Audio a3 | Audio a4 | Audio a5 | Audio a6 | Audio a7 | Audio a8 | Audio a9 | Audio a10 | Audio a11 |
|---|---|---|---|---|---|---|---|---|---|---|

Audio 1
A0_STATUS = 00b

→ PARTIAL OVERWRITING OF SECONDARY AUDIO

FIG. 6B

| Audio a1 | Audio a2 | Audio a3 | Audio a4 | Audio b1 | Audio b2 | Audio b3 | Audio b4 | Audio a9 | Audio a10 | Audio a11 |
|---|---|---|---|---|---|---|---|---|---|---|

Audio 1
A0_STATUS = 01b

FIG. 7A
Audio 1
A0_STATUS=00b

FIG. 7B
Audio 2
A1_STATUS=10b

FIG. 7C
Audio 1
A0_STATUS=00b

FIG. 7D
Audio 2
A1_STATUS=11b

APPARATUS AND METHOD FOR RECORDING/REPRODUCING MOVING PICTURE AND RECORDING MEDIUM

CROSS-REFERENCE TO RELATED APPLICATIONS

This application is a Continuation of application Ser. No. 09/598,700, filed Jun. 21, 2000, now U.S. Pat. No. 6,775,465, which is a divisional of application Ser. No. 09/507,749, filed Feb. 22, 2000 now issued as U.S. Pat. No. 6,640,046, and claims the benefit of Korean Application No. 1999-37307, filed Sep. 3, 1999, in the Korean Intellectual Property Office, the disclosure of which is incorporated herein by reference.

BACKGROUND OF THE INVENTION

1. Field of the Invention

The present invention relates to the field of moving pictures, and more particularly, to an apparatus and method for recording and/or reproducing state information associated with audio for moving pictures, and a recording medium for storing audio state information.

2. Description of the Related Art

Development in the field of digital compression techniques and increases in the capacity of recording mediums are now enabling moving picture information to be compressed into digital data and recorded. Compression techniques include a variety of standards. In the case of video, the MPEG (moving picture experts group)-2 video (ISO/IEC 13818-2) MP@HL (Main Profile at Main Level) standard, which has the same image quality as current analog televisions, is now the most widely used. The use of the MPEG-2 MP@HL (Main Profile at High Level) standard, which is capable of achieving the image quality of high definition television (HDTV) is rapidly increasing. In the case of audio, AC (Audio Coding)-3 is generally used around North America, and MPEG1/2 Audio (ISO/IEC13818-3) standard is being used in Europe. The amount of audio data is less than that of video data, so that the linear pulse coded modulation (LPCM) standard, in which there is no compression can also be used for audio.

In this way, audio data and video data are signal-processed in accordance with respective standards, and then combined into data of a bitstream. At this time, the MPEG-2 System (ISO/IEC 13818-1) standard is generally used. That is, each of the audio data and the video data is packeted, and discrimination information for discriminating between audio and video, buffer control information, and timing information for synchronizing an audio signal with a video signal, are added to each packet. Timing information related to a clock signal to be used by a decoder is also added to each packet, resulting in pack data. Here, the digital versatile disc (DVD) video standard prescribes that the size of one pack of data is 2048 bytes.

A general moving picture recording apparatus includes several important functions among which there is an after recording function of later replacing and overwriting only an audio portion among moving picture data which has already been recorded on a recording medium. Existing analog recording mediums have tracks on which video signals for moving pictures and audio signals are separately recorded, such that the after recording function is easily performed. Also, an analog signal is not recorded in a particular recording unit, so that operations required for the after recording are completed by overwriting a desired portion.

Here, audio which has been originally recorded is called original audio, and audio to be replaced and recorded later is called secondary audio. In order to preserve original audio upon recording of secondary audio, two audio tracks to separately record the original audio and the secondary audio must be prepared. Accordingly, original audio and secondary audio are discriminated from each another by the positions of their tracks.

While the two tracks are simultaneously played back, the secondary audio signal is only output when an audio signal exists in the track for secondary audio, and otherwise, an audio signal existing in the track for original audio is output. In this way, secondary audio which has been partially recorded on a track can be reproduced. When reproduction of only the original audio is desired, an audio signal on the original audio track can be reproduced independently of the existence or non-existence of audio signals on the secondary audio track.

However, in the digital recording medium, audio/video (A/V) signals have been mixed and recorded on a recording area in a predetermined recording unit without classification, such that recording and reproducing of secondary audio using the overwriting method used by the analog recording medium is not possible.

SUMMARY OF THE INVENTION

To solve the above problem, an objective of the present invention is to provide a recording medium for dividing moving picture data into a plurality of basic units, generating basic unit information, which is required for reproduction/edition and included in each basic unit, and storing audio state information in the basic unit information.

Another objective of the present invention is to provide a recording apparatus for dividing moving picture data into a plurality of basic units, generating basic unit information related to each basic unit, and storing audio state information in the basic unit information.

Still another objective of the present invention is to provide a reproducing apparatus for selectively reproducing original audio or secondary audio on the basis of audio state information.

Yet another objective of the present invention is to provide a recording method of dividing moving picture data into a plurality of basic units, generating basic unit information related to each basic unit, and storing audio state information in the basic unit information.

Still yet another objective of the present invention is to provide a reproducing method of selectively reproducing original audio or secondary audio on the basis of audio state information.

To achieve the first objective of the invention, there is provided a recording medium on which a moving image is divided into a plurality of basic units and recorded, and basic unit information related to the moving image is recorded in each basic unit, wherein the basic unit is comprised of at least one among video data, audio data and graphic data, and the audio data is comprised of first audio or first audio and second audio; the basic unit information includes the state information on the first audio and the state information on the second audio; the state information on the first audio represents an original audio state in which the first audio is original audio, or a secondary audio state in which the first audio is secondary audio recorded over part or all of the original audio; and the state information on the second audio represents a state in which the second audio is original audio, a state in which the second audio is secondary audio recorded over part or all of the original audio, a state in which the second audio is dummy audio which is exactly the same as the first audio, or a state in which the second audio is secondary audio recorded over part or all of the dummy audio.

To achieve the second objective of the invention, there is provided a moving picture recording apparatus by which a moving image is divided into a plurality of basic units and recorded, basic unit information related to the moving image is recorded on each basic unit, and the basic unit is comprised of at least one among video data, audio data and graphic data. The apparatus includes a recording controller by which first audio or first audio and second audio is recorded as the audio data, the state information on the first audio and the state information on the second audio are recorded as the basic unit information, the state information on the first audio represents an original audio state in which the first audio is original audio, and when the second audio exists, the state information on the second audio represents a state in which the second audio is original audio, or a state in which the second audio is dummy audio which is exactly the same as the first audio.

To achieve the third objective of the invention, there is provided an apparatus for playing back a recording medium on which a moving picture is divided into a plurality of basic units and recorded, basic unit information related to the moving image is recorded in each basic unit, each of the basic units is comprised of at least one among video data, audio data and graphic data among which the audio data is comprised of first audio, or first audio and second audio, the basic unit information includes the state information on the first audio and the state information of the second audio, the state information on the first audio represents a state in which the first audio is original audio, or a state in which the first audio is secondary audio recorded over part or all of the original audio, and the state information on the second audio represents a state in which the second audio is original audio, a state in which the second audio is secondary audio recorded over part or all of the original audio, a state in which the second audio is dummy audio which is exactly the same as the first audio, or a state in which the second audio is secondary audio recorded over part or all of the dummy audio. The apparatus includes a reproducing controller for reproducing the original audio and secondary audio according to the first audio state information/second audio state information.

To achieve the fourth objective of the invention, there is provided a moving picture recording method by which a moving image is divided into a plurality of basic units and recorded, basic unit information related to the moving image is recorded on each basic unit, and the basic unit is comprised of at least one among video data, audio data and graphic data. The method includes recording first audio or first audio and second audio as the audio data, and recording the state information on the first audio and the state information on the second audio as the basic unit information, wherein the state information on the first audio represents an original audio state in which the first audio is original audio, and when the second audio exists, the state information on the second audio represents a state in which the second audio is original audio, or a state in which the second audio is dummy audio which is exactly the same as the first audio.

To achieve the fifth objective of the invention, there is provided a method of playing back a recording medium on which a moving picture is divided into a plurality of basic units and recorded, basic unit information related to the moving image is recorded in each basic unit, each of the basic units is comprised of at least one among video data, audio data and graphic data among which the audio data is comprised of first audio, or first audio and second audio, the basic unit information includes the state information on the first audio and the state information of the second audio, the state information on the first audio represents a state in which the first audio is original audio, or a state in which the first audio is secondary audio recorded over part or all of the original audio, and the state information on the second audio represents a state in which the second audio is original audio, a state in which the second audio is secondary audio recorded over part or all of the original audio, a state in which the second audio is dummy audio which is exactly the same as the first audio, or a state in which the second audio is secondary audio recorded over part or all of the dummy audio. The method includes analyzing the first audio state information/second audio state information, and reproducing the original audio/secondary audio according to the analyzed audio state information.

BRIEF DESCRIPTION OF THE DRAWINGS

The above objectives and advantages of the present invention will become more apparent by describing in detail preferred embodiments thereof with reference to the attached drawings in which:

FIG. 1 is a block diagram of an optical recording/reproducing apparatus to which the present invention is applied;

FIG. 2 shows the hierarchical structure of moving picture data to facilitate understanding of the present invention;

FIGS. 4A through 4D show the pack shown in FIG. 3;

FIG. 5 shows an example of the structure of audio state information within video object information (VOBI) according to the present invention;

FIGS. 6A-6B show a state variation from before secondary audio is re-recorded, to after the secondary audio has been re-recorded, when only first audio exists; and FIGS. 7A-7D show a state variation from before secondary audio is re-recorded, to after the secondary audio has been re-recorded, when first and second audio exist.

DETAILED DESCRIPTION OF THE PREFERRED EMBODIMENTS

Figure 3A:
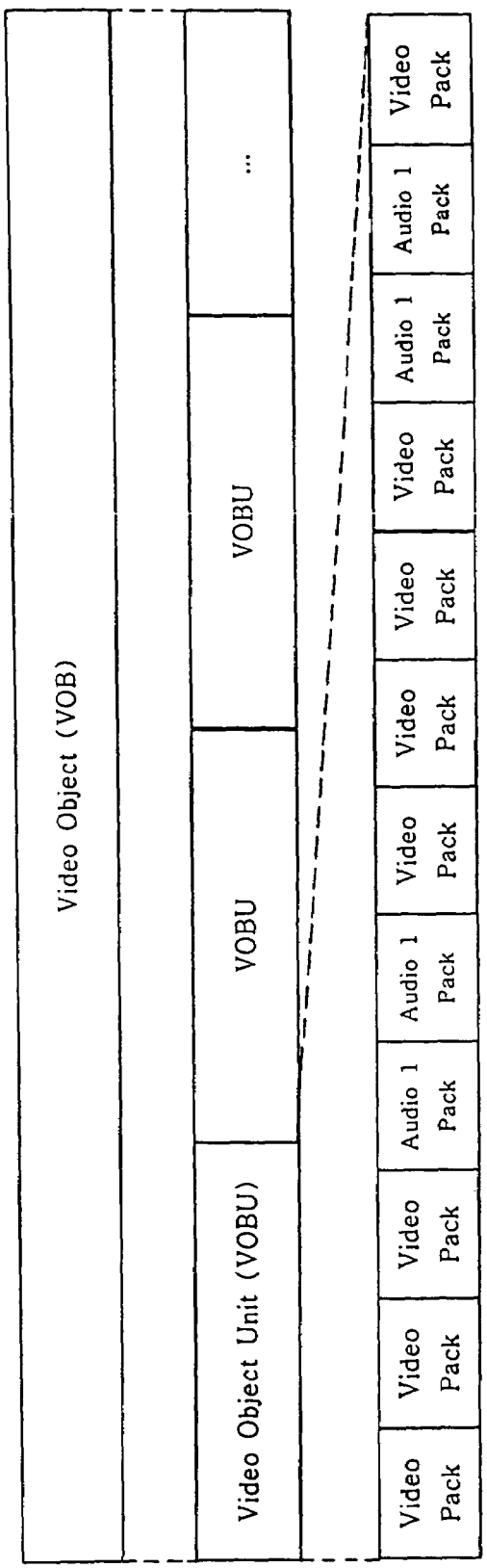
FIGS. 3A and 3B show the video object (VOB) shown in FIG. 2.

A digital versatile disk (DVD) video recorder and player as shown in FIG. 1 are adopted as a preferred embodiment of a recording apparatus and a reproduction apparatus to which the present invention is applied.

Referring to FIG. 1, blocks 102 through 114 are for reproduction, and blocks 116 and 126 are for recording. A reproduction apparatus may include only blocks for reproduction, and a recording apparatus may include only blocks for recording. An optical pickup unit 100, a key input unit & display 128 for interfacing with a user and displaying a user interface, and a system controller 130 for controlling the operation of each block, are included in both the recording apparatus and the reproduction apparatus.

Typical recorders are capable of recording and reproduction, so that all blocks can be installed in one apparatus. Thus, in the present invention, when a recording apparatus operates for reproduction, it can be a reproduction apparatus.

In the operations of blocks in a general reproduction apparatus, the optical pickup unit 100 includes an optical system for reading a signal from a recording medium and converting the read signal into an electrical signal, and a mechanism for moving the optical system so that the optical system reads and writes data at desired positions on the recording medium. This mechanism is controlled by a digital servo unit 102. A radio frequency (RF) amplifier 104 amplifies the electrical signal read from the recording medium by the optical system and provides the resultant signal to a data decoder 106. Also, the RF amplifier 104 provides a servo signal for compensating for the position of the optical system, to the digital servo unit 102.

The data decoder 106 converts the amplified electrical signal output by the RF amplifier 104, into a digital signal expressed by "0" and "1" levels on the basis of an appropriate signal level (which is called a binarization level). The digital signal has been modulated in accordance with the recording characteristics of a typical recording medium. Also, the data decoder 106 demodulates the digital signal in accordance with a demodulation scheme corresponding to a modulation scheme used upon modulation. The demodulated digital signal is an error correction code (ECC) signal to which a parity is attached to correct errors caused by scratches, defects, or the like on a recording medium. The data decoder 106 corrects a generated error by error correction decoding the demodulated data, and provides error correction coded data to an audio/video (A/V) decoder 108.

Data output by the data decoder 106 has a form in which at least one among video data, audio data and graphic data has been compressed. Audio data may not be compressed since it has a smaller amount of information in relation to the amount of video data. Video data is typically compressed in accordance with the MPEG standard. Graphic data is compressed according to a lossless compression scheme in which there is no information loss. The A/V decoder 108 decodes video, audio and/or graphic data in accordance with the respective compressed schemes to restore the video, audio and/or graphic data. In particular, the graphic data is mixed with the video data.

A memory 110 connected to the A/V decoder 108 temporarily stores the data received by the A/V decoder 108, before the data is decoded, or temporarily stores restored data before the data is output. Next, data provided from the A/V decoder 108 is converted to be output to output devices. That is, a video digital-to-analog converter (DAC) 112 converts a restored digital video data into an analog video signal, and outputs the analog video signal to a television or a monitor. An audio DAC 114 converts a restored digital audio data into an analog audio signal, and outputs the analog audio signal to a speaker or an audio amplifier. The TV, monitor, speaker, and audio amplifier, which are final output devices, are not shown in FIG. 1.

In the operation of blocks in a recording apparatus, an audio signal or a video signal is received from an external input device. Here, the external input device can be a TV, a camera or the like, and is not shown in FIG. 1.

Received video and audio signals are of an analog or digital form, and appropriately pre-processed and converted into digital data. In FIG. 1, analog video and audio signals are received. To be more specific, a video preprocessor 116 performs a function such as a filtering operation for minimizing secondary effects which are produced while the analog video signal is converted into digital data, and then converts the analog video signal into a digital video signal. An audio preprocessor 118 performs a function such as a filtering operation for minimizing secondary effects which are produced while the analog audio signal is converted into digital data, and then converts the analog audio signal into a digital audio signal. An A/V encoder 120 compresses the digital audio and/or video signals to reduce the amount of audio data and/or video data, and appropriately processes the compressed audio and/or video signals. That is, video is typically encoded using a compression scheme called MPEG video (ISO/IEC13818-2), and audio is typically encoded using a compression scheme such as AC-3 or MPEG audio (ISO/IEC13818-3). However, audio may not be compressed since it has a smaller amount of data in relation to the amount of video data. It is common that information based on the MPEG system (ISO/IEC13818-1) standard is added to the encoded video data and encoded audio data. This information is required for decoding each of the video data and audio data, and can be information on buffer occupancy control upon decoding, and timing information required for synchronizing the audio signal with the video signal.

Graphic data is typically received by an exclusive input apparatus. Alternatively, graphic data is produced by the system controller 130 which receives a user input, compressed by an exclusive compressor, and mixed with the A/V data. In the A/V encoder 120, the compression and mixing of graphic data may be performed. However, the graphic data part is not shown in FIG. 1.

A memory 122 connected to the A/V encoder 120 temporarily stores data received by the A/V encoder, before the received data is encoded, or temporarily stores encoded data before the encoded data is output. A data encoder 124 error correction encodes the encoded data output by the A/V encoder 120, and modulates the error correction encoded data in accordance with the recoding characteristics of a recording medium. A laser diode (LD) power controller 126 emits an optical signal corresponding to data output from the data encoder 124 to the recording medium using a laser beam, thereby achieving recording.

The key input unit & display 128, which is for interfacing a user to the recording or reproduction apparatus, receives a command such as reproduction start, reproduction stop, recording start or recording stop from a user, transmits the received command to the system controller 130, and displays the selection of the user on a menu, an on screen display (OSD), or an on screen graphic (OSG). The system controller 130 transmits functions required according to each operational command set by a user, to all blocks, and controls the blocks, thereby performing the operation set by a user.

The A/V decoder 108 and the A/V encoder 120 separately installed in FIG. 1 may be integrated in a single block which can perform encoding and decoding. Also, the memory 110 for decoding and the memory 120 for encoding may be integrated in a single memory.

Accordingly, when the optical recording/reproduction apparatus shown in FIG. 1 records a moving image on a recording medium, it divides the moving image information into a plurality of basic units and records the plurality of basic units on the recording medium using the recording blocks 116 through 126 and 100. The system controller 130 produces information required for reproduction/edition for each basic unit, and manages this as basic unit information. The basic unit information produced by the system controller 130 is recorded on the recording medium via the data encoder 124, the LD power controller 126, and the optical pickup unit 100.

Here, the basic unit includes at least one among video data, audio data, and graphic data. In particular, audio data includes only one type of audio, or includes first audio and second audio. When a user records secondary audio, the secondary audio is recorded over part or all of the first audio or second audio, and the modified state of the first audio or second audio is managed as the state information of the first audio or second audio within the basic unit information. In the case of DVD video recording as a preferred embodiment of the present invention, the basic unit is referred to as video object (VOB) and the basic unit information is referred to as video object information (VOBI).

Figures 7A, 7B, 7C, 7D:
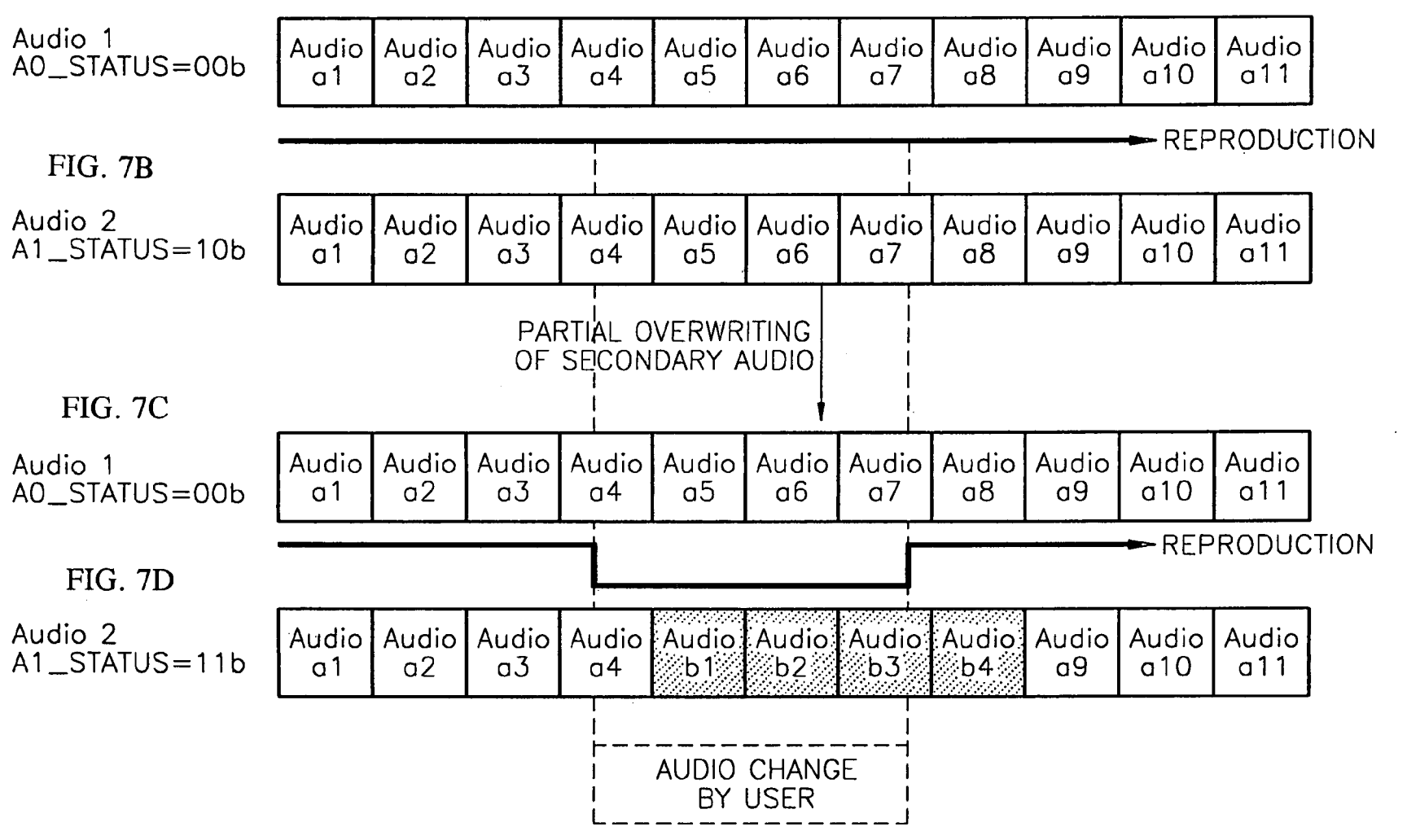

Upon reproduction, the system controller 130 checks the first or second audio state information stored in the basic unit information which is reproduced via the optical pickup unit 100, the RF AMP 104, and the data decoder 106, and controls the key input unit & display 128 to display the audio state information in the basic unit information on a menu or the like so that the user recognizes the audio state information. Therefore, according to the selection of a user, audio data among moving image data recorded in a plurality of basic units on the recording medium is reproduced by the blocks 100 through 114 for reproduction shown in FIG. 1. This will be described later with reference to FIGS. 5 through 7.

The hierarchical structure of moving image data will now be described with reference to FIG. 2, to facilitate the understanding of the present invention.

When a user records moving image data, the moving image data is actually recorded on a recording medium using the blocks 116 through 126 and 100 for recording shown in FIG. 1. In DVD video recording, each recorded data is divided into units of video objects (VOB). That is, moving image data recorded from when a user presses down on a recording start button until when the user presses down on a recording stop button, is one VOB.

A plurality of VOBs are recorded on a recording medium. For example, VOB#1, VOB#2 and VOB#3 are shown in FIG. 2. As described above, video data, audio data and graphic data are mixed and recorded in one VOB. In the present invention, these VOBs are referred to as real time bitstream data, and each VOB is recorded in a single file in the case of DVD video recording.

Upon reproduction, recorded VOBs are decoded and reproduced by the blocks 100 through 114 for reproduction shown in FIG. 1. It is of use to separately record information required for VOB reproduction. For example, the width and length (resolution) of video data within a corresponding VOB, the encoding scheme of audio data, or the like, can be separately recorded. Also, when a VOB has been encoded at a variable bit rate (VBR), the position of data within the VOB does not match with a reproduction time. Accordingly, separate recording of the position of data according to reproduction time is useful to accomplish a special reproduction function such as time search. These data constitute VOBI. That is, VOBI (VOBI#1, VOBI#2 and VOBI#3 shown in FIG. 2) exists in each VOB, and each VOBI includes information required to reproduce or edit a corresponding VOB.

A program can be a unit of moving image information for a user. That is, the user understands that a plurality of programs are recorded on a recording medium. In the DVD video recording, the relationship between a program and a VOB is determined as follows. That is, a program includes a plurality of cells, and a cell denotes part or all of a VOB. Consequently, a program includes some or all of a plurality of VOBs.

In general, a program includes a cell, and a cell corresponds to an entire VOB. Here, when a program undergoes an editing process in response to a command from a user, such as, partial deletion of a program, merging of programs, or production of a program in the order desired by a user, the shape of the program becomes slightly more complicated than the aforementioned general shape.

Information related to the plurality of programs constitutes program chain information (PGCI). The VOBI and the PGCI constitute navigation data. That is, a real time bitstream which is moving image data, and navigation data which is information required to reproduce the moving image data, are recorded together on a recording medium.

As described above, the program is finally recognized by a user. Here, the program is transmitted to the user using a menu or the like. A menu corresponding to each program (e.g., Program #1, Program #2 and Program #3 shown in FIG. 2) is displayed. When a user selects a program #n, cells pertaining to this selected program are searched for, and corresponding portions of VOBs indicated by these cells are reproduced. Information which is required for this reproduction can be obtained from corresponding VOBIs.

Figure 3B:
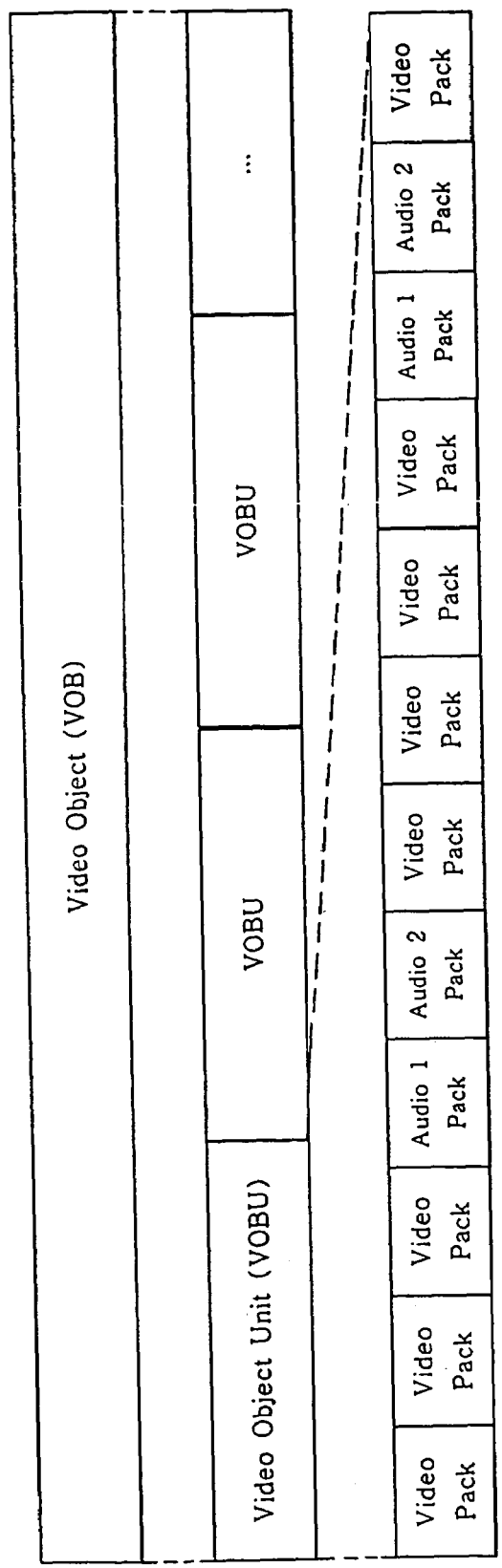

FIGS. 3A and 3B show the internal configuration of a VOB shown in FIG. 2. Referring to FIGS. 3A and 3B, a VOB includes a plurality of video object units (VOBUs), and each VOBU includes a plurality of video packs, audio packs and/or graphic packs. The VOBU relates to a method of encoding video data. The MPEG standard, which is used as a video encoding method, uses the correlation between frames of moving picture data.

In moving picture data constituted of tens of frames per second, each frame generally includes the same information. For example, in the case of moving pictures in which a human being moves, the background of each picture remains the same, and there is only a small amount of movement in each frame due to the human being. Hence, the foremost frame is entirely recorded, and in the next frames, only portions that are different from the previous frame are recorded. In this way, the amount of data to be recorded is sharply reduced.

The MPEG encoding method conceptually uses such a recording method. In this case, there is a disadvantage in that a middle frame requires a previous frame to be restored. Therefore, even when it is desired for a middle frame to be reproduced, previous frames thereof must be reproduced starting from the foremost frame. MPEG solves this disadvantage using a structure of a group of picture (GOP). That is, a predetermined number of frames constitute a group, and all information on the frames is recorded on the head frame in this group. In this case, in order to reproduce a middle frame, the head frame within a GOP to which the middle frame pertains can start being reproduced. A typical GOP is constituted of 12 to 15 frames. A VOBU includes a plurality of GOPs.

A VOBU includes a plurality of video packs, audio packs and/or graphic data packs in a form based on the MPEG system standard. Each pack includes information on its type.

FIG. 3A refers to the case in which a type of audio stream exists for one video stream formed as a pack, and FIG. 3B refers to the case in which two types of audio streams exist for one video stream formed as a pack. When there are a plurality of types of audio streams as described above, a user can select and reproduce a desired type of audio stream.

The pack structure will now be described in more detail with reference to FIGS. 4A through 4D. A pack typically includes a packet. In the case of DVD video recording, at most two packets are required for one pack. When two packets are required, one packet among two must be a padding packet for simply occupying a place on data.

Figure 4A:
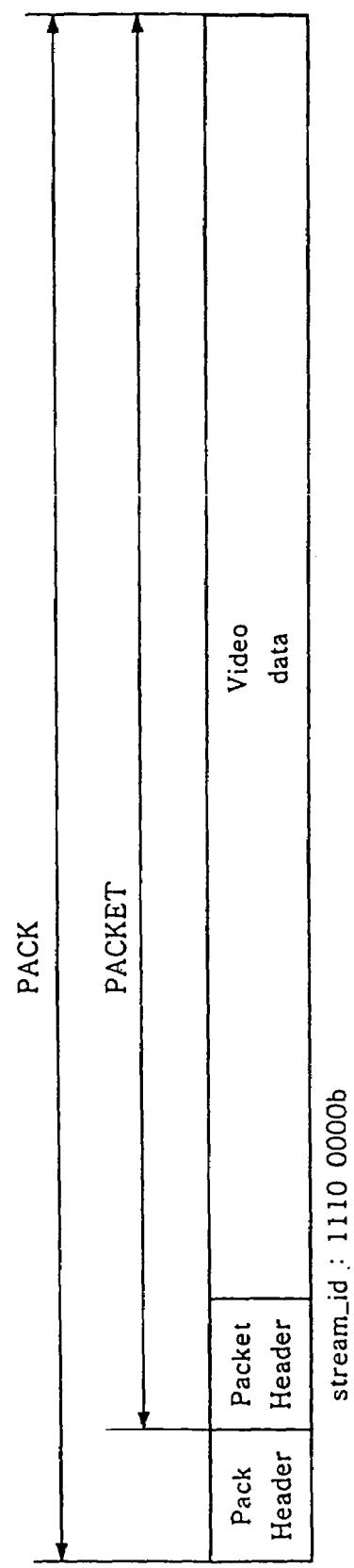
Figure 4B:
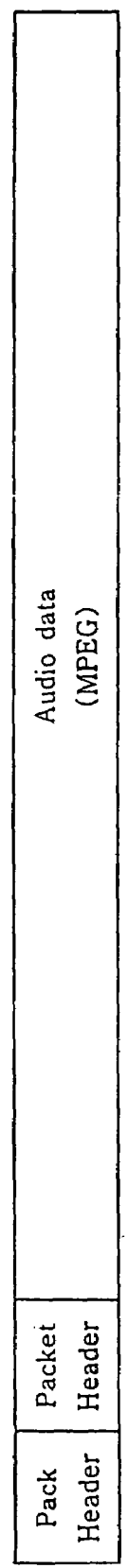

Each packet is divided into a packet header and a payload part. In a packet header, information representing the type of a corresponding packet is recorded as a parameter which is referred to as a stream identifier (stream_id). In the case of video, the stream identifier (stream_id) is a binary number "1110 0000b" as shown in FIG. 4A. In the case of audio, only MPEG audio can be represented as a stream identifier (stream_id) as shown in FIG. 4B, and the stream identifier (stream_id) is "1100 000xb". Here, x, which is 0 or 1, can provide two types of audio.

In the case when audio is AC-3 audio or LPCM audio, a procedure is further required to identify the AC-3 audio or LPCM audio. That is, the AC-3 audio and LPCM audio have the same stream identifier (stream_id) of "1011 1101b".

Header information corresponding to the AC-3 audio or LPCM audio is recorded in the payload part, and real audio data follows the recorded header information. The header information includes a parameter which is referred to as a substream identifier substream_id. In the case of AC-3, "1000 000xb" is stored in the substream identifier parameter (substream_id) as shown in FIG. 4D. In the case of LPCM, "1010 000xb" is stored in the substream identifier parameter (substream_id) as shown in FIG. 4C. Here, x can be "0" or "1", thus capable of providing two types of audio. In the present invention, when x is "0", this case refers to first audio (audio 1), and when x is "1", this case refers to second audio (audio 2).

The first audio is used for recording fundamental original audio. Later, a user can record secondary audio on part of the first audio. In this case, original audio which is overwritten by the secondary audio, is deleted.

The second audio can be used for recording original audio or for recording secondary audio. When the second audio is used for recording original audio, there are two original audio together with the first audio. However, original audio is not recorded on only the second audio without the first audio. When the second audio is original audio, a user recognizes the second audio as original audio from the beginning. Therefore, the first audio and the second audio have the same priority. When secondary audio is recorded, either the first audio or the second audio is selected, and then the secondary audio is recorded on the selected audio.

When second audio is recorded as secondary audio from the beginning, the following restrictions must be observed. Upon initial recording, second audio having exactly the same content as the content of first audio, must be recorded. That is, the second audio is the same as the first audio in terms of content, so that a user cannot recognize the second audio. Such a state is called a dummy audio state.

Accordingly, when a user desires to record secondary audio later, the secondary audio is recorded on a corresponding portion of the second audio in a dummy state. When the second audio is overwritten by the secondary audio in this way, it is recognized by the user for the first time, and the user selects and reproduces one audio among the first audio and the second audio. Since the second audio is the same as the first audio except for the portion on which the secondary audio is recorded, the same content is reproduced even if the selection of audio is changed. The reason why second audio having the same content as the content of first audio is recorded is that in the case of a digital recording medium, it is difficult to extract and reproduce portions on which secondary audio has been recorded. That is, if the second audio is reserved and only part thereof is occupied by secondary audio, audio is not reproduced from portions on which secondary audio has not been recorded, when the second audio is selected, which causes a user to be confused.

Alternatively, first audio can be reproduced at empty portions of the second audio, and second audio can be reproduced at portions of the second audio on which secondary audio has been recorded. However, in this case, a determination as to whether audio has been recorded on the second audio must be made, which makes it difficult to achieve the alternative method.

In the present invention, a user is informed of the states of first audio and second audio before the states are recorded on and reproduced from a corresponding VOBI in a VOB, or used to perform an appropriate operation when a user has made audio change during reproduction.

FIG. 5 shows an example of the structure of first audio state information and second audio state information within video object information (VOBI) according to the present invention.

The first audio state information A0_STATUS represents a state (00b) in which original audio has been recorded, or a state (01b) in which part or all of the original audio is secondary audio.

The state 00b represents that first audio is original audio. When second audio is not recorded, a user records secondary audio over part or all of the original audio. At this time, the first audio is overwritten by secondary audio, and the state information of the first audio is changed from "00b" to "01b".

The second audio state information A1_STATUS can be a dummy state 10b in which the content of the second audio is completely the same as that of the first audio, or a state 11b in which part or all of the second audio has been overwritten by secondary audio, in addition to the above-described two states. Thus, one state among a total of four states is recorded as the second audio state information A1_STATUS.

Consequently, the first audio state information A0_STATUS and the second audio state information A1_STATUS are defined as follows.

A0_STATUS:
00b . . . first audio is original audio.
01b . . . first audio is secondary audio re-recorded over part or all of original audio.

A0_STATUS:
00b . . . second audio is original audio.
01b . . . second audio is secondary audio re-recorded over part or all of the original audio.
10b . . . second audio is dummy audio whose content is exactly the same as the content of the original audio.
11b . . . second audio is secondary audio re-recorded over part or all of dummy audio.

In a method of using the first and second audio information, the case in which the second audio is in a dummy audio state is the most important. When state information representing that second audio is dummy audio is recorded, it is considered to a user as the case in which second audio is not recorded. Thus, this situation can be displayed on a menu or the like. At this time, even when a user performs an audio conversion function, the first audio can continue being reproduced. That is, in the state "10b" representing dummy audio, reproduction of the first audio can be set as default.

When the second audio is in one of three states 00b, 01b and 11b other than the dummy audio state 10b, the three states of the second audio indicate that audio data having a different content to the content of the first audio has been recorded. Thus, a user is informed of this state of the second audio, and thus can perform audio change. In particular, when the second audio state information A1_STATUS is the state 11b in which the second audio is secondary audio re-recorded on part or all of the dummy audio, reproduction of the second audio can be set as default.

FIGS. 6A and 6B show a state variation from before secondary audio is re-recorded, to after the secondary audio is re-recorded, when only first audio exists. That is, the case (A0_STATUS=00b) of first audio in original audio state, and the case (A0_STATUS=01b) in which only some sections a5 through a8 of the original audio are overwritten by secondary audio b1 through b4 through overwriting/edition, are shown in FIGS. 6A and 6B. In this case, the first audio state information A0_STATUS is renewed from "00b" to "01b", and the variation of the audio state can be displayed through a menu or the like on the key input unit & display 128 shown in FIG. 1 so that a user is informed of the variation of the audio state.

FIGS. 7A through 7D show a state variation from before secondary audio is re-recorded, to after the secondary audio has been re-recorded, when first and second audio exist. When the first audio is original audio (i.e., A0_STATUS=00b) and the second audio is in the dummy state in which the second audio is the same as the first audio (i.e., A1_STATUS=10b), reproduction of only first audio is set as default, and the direction of reproduction is indicated by a thick solid arrow.

Second audio in a dummy audio state having some sections a5 through a8 overwritten by secondary audio b1 through b4 is shown in FIGS. 7A through 7D. The second audio state information A1_STATUS is renewed from "10b" to "11b". Here, the first audio remains in the original audio state (i.e., A0_STATUS =00B).

Part of the second audio in a dummy state is overwritten by secondary audio, and, then, audio change by a user through a menu or the like, is performed. At this time, the content of audio reproduced is changed, which is represented by a thick solid arrow indicating the direction of reproduction. That is, as shown in FIGS. 7A through 7D, first audio a1 through a4 are reproduced, second audio b1 through b3 in the second audio are then reproduced due to the audio change by the user, and the first audio is reproduced again from a8 due to the audio change by the user.

As described above, in the present invention, audio state information related to a moving image, obtained through recording/overwriting/editing, is stored in recording unit information VOBI for a corresponding recording unit VOB, and reported to a user before the moving image is reproduced, so that the user can recognize the audio state. Also, during reproduction, the user can appropriately cope with audio change.

What is claimed is:

1. A moving picture recording and/or editing method of recording secondary audio on a recording medium having a moving image, the method comprising:
   recording and/or editing secondary audio over part or all of first audio, which is original audio when only the first audio exists, the moving image being divided into a plurality of basic units, basic unit information related to the moving image being recorded in each basic unit, the basic unit comprising at least video data and audio data, the audio data comprising the first audio, or the first audio and the second audio, and first state information and, if the second audio exists, second state information indicative of the first and second audio, respectively, being recorded in the basic unit information; and
   recording a state in which the first audio is the secondary audio recorded over part or all of the original audio, as the first state information on the first audio within the basic unit information,
   wherein the second state information represents a state in which the second audio remains as the original audio, a state in which the second audio has been modified from the original audio, a dummy state in which the second audio has a same stream as a stream in the original audio of the first audio, and a state in which the second audio has been modified from the dummy state.

2. The method of claim 1, further comprising:
   recording and/or editing the secondary audio over part or all of the second audio which is original audio or dummy data when the second audio exists; and
   recording a state in which the second audio is the secondary audio recorded over part or all of the original audio, or a state in which the second audio is secondary audio recorded over part or all of the dummy audio, as the second state information on the second audio within the basic unit information.

3. A method of recording/reproducing data on/from a recording medium, comprising:
   dividing an image into a plurality of basic units and recording the basic units on the recording medium, wherein each basic unit comprises at least video data and audio data, and the audio data comprises at least one type of audio stream; and
   recording basic unit information related to a corresponding part of the image in each basic unit on the recording medium,
   wherein:
   the basic unit information includes first state information related to a type of the first audio streams, and the first state information represents a state in which the first audio is original audio, or a state in which the first audio has been modified from the original audio, and
   the basic unit information further comprises second state information related to a second-type of the audio streams, and the second state information represents a state in which the second audio remains as original audio, a state in which the second audio has been modified from the original audio, a dummy state in which the second audio has the same stream as a stream in the original audio of the first audio, and a state in which the second audio has been modified from the dummy state.

4. The method of claim 3, further comprising:
   recording and/or editing secondary audio on the first audio or second audio; and
   updating the first state information on the first audio when modified audio has been recorded and/or edited on the first audio, and updating the second state information on the second audio when modified audio has been recorded and/or edited on the second audio.

5. The method of claim 3, further comprising:
   analyzing the first state information and the second state information recorded on the recording medium; and
   reproducing the original audio or modified audio according to the analyzed first and second state information.

6. The method of claim 5, further comprising:
   displaying the analyzed first and second state information; and
   reproducing the original audio and modified audio while responding to an audio change through a user interface, based on the displayed first and second state information.

7. A method of playing back a recording medium on having a moving picture, the method comprising:
   reading first state information on first audio and, if second audio exists, second state information on the second audio, before reproducing the moving image, the moving image being divided into a plurality of basic units, and basic unit information being related to the moving image recorded in each basic unit, each basic unit comprising at least video data and audio data, and the audio data comprising the first audio, or the first audio and the second audio, and the basic unit information including first state information on the first audio and, if the second audio exists, the second state information on the second audio; and
   reporting the read state information to a user before reproducing the moving image,
   wherein the second state information represents a state in which the second audio remains as original audio, a state in which the second audio has been modified from the original audio, a dummy state in which the second audio has a same stream as a stream in the original audio of the first audio, and a state in which the second audio has been modified from the dummy state.

8. The method of claim 7, wherein the read first state information indicates a state in which the first audio is original audio, or a state in which the first audio has been modified from the original audio, and the second state information indicates a state in which the second audio is original audio, or a state in which the second audio has been modified from the original audio.

* * * * *